(12) United States Patent
Wade

(10) Patent No.: US 9,410,861 B2
(45) Date of Patent: Aug. 9, 2016

(54) PRESSURE SENSOR WITH OVERPRESSURE PROTECTION

(71) Applicant: Honeywell International Inc., Morristown, NJ (US)

(72) Inventor: Richard Wade, Worthington, OH (US)

(73) Assignee: Honeywell International Inc., Morris Plains, NJ (US)

( * ) Notice: Subject to any disclaimer, the term of this patent is extended or adjusted under 35 U.S.C. 154(b) by 106 days.

(21) Appl. No.: 14/225,059

(22) Filed: Mar. 25, 2014

(65) Prior Publication Data

US 2015/0276526 A1   Oct. 1, 2015

(51) Int. Cl.
*G01L 13/02* (2006.01)
*G01L 7/08* (2006.01)
*G01L 9/00* (2006.01)
*G01L 19/06* (2006.01)

(52) U.S. Cl.
CPC ............ *G01L 7/08* (2013.01); *G01L 9/0045* (2013.01); *G01L 9/0051* (2013.01); *G01L 13/025* (2013.01); *G01L 19/0618* (2013.01)

(58) Field of Classification Search
CPC .......... G01L 7/08; G01L 13/025; G01L 7/00; G01B 7/18
USPC .................... 73/716, 715, 763, 700
See application file for complete search history.

(56) References Cited

U.S. PATENT DOCUMENTS

| 4,102,210 | A | * | 7/1978 | Couston | ............... | G01L 9/0051 338/4 |
| 4,592,238 | A | * | 6/1986 | Busta | .................. | G01L 9/0042 29/621.1 |
| 4,852,408 | A | | 8/1989 | Sanders et al. | | |
| 4,905,575 | A | | 3/1990 | Knecht et al. | | |
| 5,062,302 | A | | 11/1991 | Petersen et al. | | |
| 5,157,973 | A | * | 10/1992 | Ciminelli | .............. | G01L 9/0073 361/283.4 |
| 5,234,571 | A | | 8/1993 | Noeker | | |
| 5,333,504 | A | * | 8/1994 | Lutz | .................... | G01L 19/0618 338/4 |
| 5,357,808 | A | | 10/1994 | Fung et al. | | |
| 5,381,299 | A | * | 1/1995 | Provenzano | .......... | G01L 9/0073 29/25.42 |
| 6,030,854 | A | | 2/2000 | Mashimoto et al. | | |
| 6,330,829 | B1 | | 12/2001 | Kurtz et al. | | |
| 7,360,431 | B2 | | 4/2008 | Yoneda et al. | | |
| 7,503,221 | B2 | * | 3/2009 | Wade | .................... | G01L 9/0051 73/721 |

(Continued)

FOREIGN PATENT DOCUMENTS

JP   20022340718   11/2002
WO   9405986   3/1994

(Continued)

OTHER PUBLICATIONS

European Search Report for Corresponding EP Application No. 1558319.2-1557, dated Aug. 20, 2015.

*Primary Examiner* — Lisa Caputo
*Assistant Examiner* — Nigel Plumb
(74) *Attorney, Agent, or Firm* — Conley Rose, P.C.; Kristin Jordan Harkins

(57) ABSTRACT

A pressure sensor may include an input for receiving an input pressure and a sense die having a sense diaphragm that is exposed to the input pressure and is configured to deflect in response to the input pressure. A diaphragm stop may be positioned adjacent to a first side of the sense diaphragm to limit deflection of the sense diaphragm towards the diaphragm stop. The diaphragm stop include a plurality of defined projections to help prevent stiction.

20 Claims, 9 Drawing Sheets

(56) References Cited

U.S. PATENT DOCUMENTS

| | | |
|---|---|---|
| 7,930,944 B2 | 4/2011 | Machir et al. |
| 8,230,745 B2 | 7/2012 | Rozgo et al. |
| 8,516,897 B1 | 8/2013 | Jones et al. |
| 2005/0081638 A1 | 4/2005 | Couch et al. |
| 2006/0272422 A1* | 12/2006 | Yoneda ............... G01L 19/0618 73/724 |

FOREIGN PATENT DOCUMENTS

| | | |
|---|---|---|
| WO | 2011140140 A1 | 11/2011 |
| WO | 2013060697 | 5/2013 |

* cited by examiner

PRESSURE SENSOR WITH OVERPRESSURE PROTECTION

TECHNICAL FIELD

The present disclosure relates generally to sensors, and more particularly, to pressure sensors.

BACKGROUND

Pressure sensors often include a pressure sense element that is configured to detect a pressure of a media to be sensed by converting mechanical stress caused by the incoming pressure of the media into an electrical output signal. Pressure measurements are typically taken in the context of absolute, gauge, or differential (or relative) pressure measurements. An absolute pressure sensor represents a specific type of sensing device, which measures a pressure relative to a vacuum (or a sealed reference). A gauge sensor, on the other hand, measures a pressure relative to atmospheric pressure. A differential pressure sensor measures a pressure difference between two input pressures. These and other types of pressure sensors are used in a wide variety of applications including, for example, commercial, automotive, aerospace, industrial, and medical applications, among other similar and dissimilar industries.

SUMMARY

This disclosure relates generally to sensors, and more particularly, to sensors that may be exposed to overpressure during use. Although sensor assemblies are known to exist, there is need for improvement to such sensor assemblies.

Accordingly, in one example, a pressure sensor may include an input for receiving an input pressure and a sense die having a sense diaphragm that is exposed to the input pressure and is configured to deflect in response to the input pressure. One or more sense elements may be operatively coupled to the sense diaphragm in order to sense deflection of the sense diaphragm. A first diaphragm stop may be positioned adjacent to a first side of the sense diaphragm to limit deflection of the sense diaphragm towards the first diaphragm stop. The first diaphragm stop may include a first diaphragm stop surface facing the first side of the sense diaphragm, the first diaphragm stop including a plurality of defined projections.

In another example, a pressure sensor may include an input for receiving an input pressure and a sense die having a first major surface and an opposing second major surface. A recess may be provided in the first major surface to form a recessed first surface, wherein a sense diaphragm is defined between the recessed first surface and the second major surface of the sense die. The sense diaphragm may be exposed to an input pressure, and may deflect in response to the input pressure. One or more sense elements may be operatively coupled to the sense diaphragm to sense the deflection of the sense diaphragm. A first substrate may be secured relative to the first major surface of the sense die. The first substrate may have a first diaphragm stop that extends away from the substrate and into the recess in the sense die and adjacent to the recessed first surface of the sense diaphragm to limit deflection of the sense diaphragm towards the first diaphragm stop. In some cases, a second substrate may be secured relative to the second major surface of the sense die. The second substrate may have a second diaphragm stop that extends adjacent to the second major surface of the sense diaphragm to limit deflection of the sense diaphragm towards the second diaphragm stop.

In yet another example, a pressure sensor may include an input for receiving an input pressure, and a sense diaphragm exposed to the input pressure and configured to deflect in response to the input pressure. One or more sense elements may be operatively coupled to the sense diaphragm to sense the deflection of the sense diaphragm. A diaphragm stop may be positioned adjacent to the sense diaphragm to limit deflection of the sense diaphragm. The diaphragm stop may have a diaphragm stop surface for engaging the sense diaphragm when the sense diaphragm has deflected by a predefined amount due to the input pressure. In some cases, the diaphragm stop surface may have a topography that is configured to reduce static friction (e.g. stiction) between the diaphragm stop surface and the sense diaphragm relative to a smooth diaphragm stop surface.

The preceding summary is provided to facilitate a general understanding of some of the innovative features of the present disclosure, and is not intended to be a full description. A full appreciation of the disclosure can be gained by taking the entire specification, claims, drawings, and abstract as a whole.

BRIEF DESCRIPTION OF THE DRAWINGS

The accompanying figures, in which like reference numerals refer to identical or functionally-similar elements throughout the separate views, and which are incorporated in and form a part of the specification, further show several illustrative embodiments and, together with the description, serve to explain the several illustrative embodiments, wherein.

Figure 1:
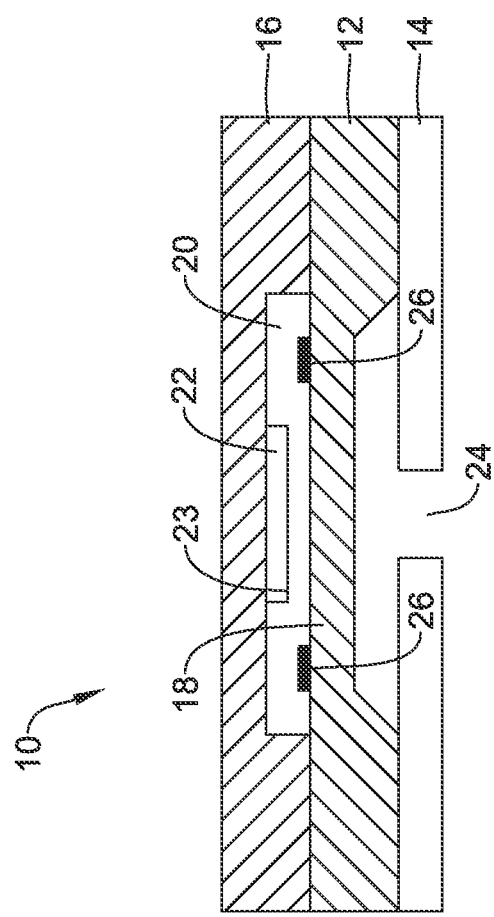
FIG. 1 is a schematic cross-sectional view of an illustrative pressure sensor.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings, which are not necessarily to scale, depict illustrative embodiments and are not intended to limit the scope of the disclosure. The illustrative embodiments depicted are intended only as exemplary.

FIG. 1 is a schematic cross-sectional view of an illustrative pressure sensor 10. Pressure sensor 10 may include a sense die 12, a base layer 14 and a top layer 16. It is contemplated that the term "layer" here is intended to include any suitable layer(s) or layer combination, including integral layers or separately formed layers such as separately formed substrate(s), die(s), and/or other element(s).

Sense die 12 may include a sense diaphragm 18 that in some embodiments is defined by a portion of sense die 12 that is thinner than other portions of sense die 12. It will be appreciated that in some embodiments, pressure sensor 10 may include additional layers and/or elements not expressly shown in FIG. 1. Generally speaking, pressure sensor 10 may be any type of pressure sensor. In one example, pressure sensor 10 may be a pressure sensor such as an absolute pressure sensor, a gauge pressure sensor, a differential pressure sensor, or other pressure sensor as desired. Example pressure sensors may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2010/00184324; 2007/0095144; and 2003/0167851, all of which are hereby incorporated by reference.

In the example shown in FIG. 1, pressure sensor 10 is an absolute pressure sensor. Accordingly, top layer 16 may include a cavity 20 that is constructed with a particular reference pressure. Cavity 20 may include a fluid that is pressurized at the particular reference pressure. Top layer 16 may also include a stop 22 which, as will be discussed in greater detail, can limit upward (in the illustrated orientation) travel of sense diaphragm 18. Base layer 14 may include a fluid path 24 that functions as an input port for receiving an input pressure. An input pressure, such as a pressurized fluid media (e.g. liquid or gas), can travel through fluid path 24 and exert a force on sense diaphragm 18. If the input pressure is greater than the reference pressure within cavity 20, sense diaphragm 18 will flex or bend in an upward (in the illustrated orientation) direction. It will be appreciated that reference herein to particular directions such as up and down are illustrative only, as pressure sensor 10 may be used in a variety of different spatial orientations.

In order to sense movement such as flexing or bending of sense diaphragm 18, pressure sensor 10 may include one or more sense elements 26 that may be disposed about sense diaphragm 18. Sense elements 26 may be any elements that are configured to convert mechanical movement, stress and/or deflection of sense diaphragm 18 into an electrical signal. In some embodiments, for example, sense elements 26 may be piezo-resistors. In some embodiments, sense elements 26 may, for example, be arranged in a Wheatstone bridge (e.g. half or full bridge) in order to provide an electrical signal that is indicative of the mechanical deflection of sense diaphragm 18. While two sense elements 26 are shown in the illustrated cross-section of FIG. 1, it will be appreciated that pressure sensor 10 may include any desired number of sense elements 26. In some embodiments, a total of four sense elements 26 may be arranged in a Full Wheatstone bridge configuration.

In some embodiments, sense diaphragm 18 may be considered as having a perimeter that defines a cross-sectional surface area of sense diaphragm 18. Stop 22 may be considered as having a stop surface 23 having a perimeter that defines a cross-sectional area of stop surface 23. In some embodiments, the cross-sectional area defined by the perimeter of stop surface 23 is between about 10 and 95 percent of the cross-sectional surface area defined by the perimeter of sense diaphragm 18. In some embodiments, the cross-sectional area defined by the perimeter of stop surface 23 is between 60 and 90 percent of the cross-sectional area defined by the perimeter of sense diaphragm 18. In some embodiments, the cross-sectional area defined by the perimeter of stop surface 23 is between 60 and 75 percent of the cross-sectional area defined by the perimeter of sense diaphragm 18.

The elements forming pressure sensor 10 may be formed from any desired and appropriate material. For example, sense die 12 may be formed from a silicon material, a material including at least some silicon (e.g., a silicon blend), GaAs, metal, and/or any other material having similar or dissimilar properties. Sense diaphragm 18 may be formed in sense die 12 by, for example, etching, machining, or any other forming technique configured to form sense diaphragm 18 within sense die 12. In some cases, sense elements 26 may be piezoresistive elements made from or including a piezoelectric material and/or one or more other materials that may be configured to change or modify its electrical or other properties in response to a mechanical stress or movement.

Base layer 14 and top layer 16 may be formed of any suitable material. In some embodiments, base layer 14 and/or top layer 16 may be at least partially made from a metal material (e.g., a metal material including aluminum, stainless steel, a nickel-cobalt ferrous alloy such as KOVAR®, any other metal material, and/or any combination of metal materials). In some cases, base layer 14 and/or top layer 16 may be entirely made from a metal material, while in other cases, base layer 14 and/or top layer 16 may be coated with a metal material. In some embodiments, base layer 14 and/or top layer 16 may be at least partially formed of a glass material (e.g., borosilicate glass, such as PYREX®, BOROFLOAT® 33, HOYA SD-2, and/or other borosilicate glass materials, etc.). In some embodiments, base layer 14 and/or top layer 16 may be at least partially formed of a ceramic material. In some embodiments, the materials used to form each of sense die 12, base layer 14 and top layer 16 may be selected to be thermally compatible.

In some embodiments, while not expressly illustrated, base layer 14 and/or top layer 16 may include two or more distinct layers, each layer being the same material or a different material. Each layer, if present, may be joined using any suitable technique. Sense die 12, base layer 14 and top layer 16 may be joined together to form pressure sensor 10 using any desired method or technique. For example, in some embodiments, sense die 12, base layer 14 and top layer 16 may be joined together using anodic bonding, frit bonding, fusing, welding, soldering, an adhesive, or any other suitable bonding, connecting or sealing technique, as desired.

Figure 2:
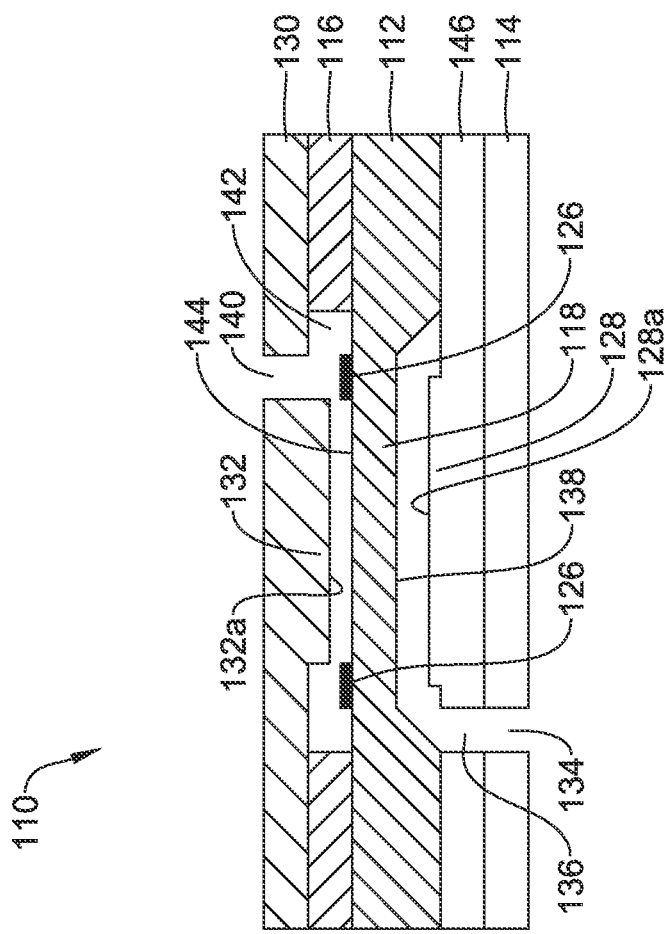
FIG. 2 is a schematic cross-sectional view of an illustrative pressure sensor.

FIG. 2 provides another illustrative but non-limiting example of pressure sensor 110. Pressure sensor 110 is a differential pressure sensor and may include a sense die 112, a base layer 114 and a top layer 116. Sense die 112 may include a sense diaphragm 118, which in some embodiments is defined by a portion of sense die 112 that is thinner than other portions of sense die 112. It will be appreciated that in some embodiments, pressure sensor 110 includes additional layers and elements not expressly shown in FIG. 2.

As shown, pressure sensor 110 may include a constraint layer 146 including a constraint layer stop 128. Constraint layer stop 128 may be formed as a raised portion of constraint layer 146 and may extend upward (in the illustrated orientation) towards sense diaphragm 118. As will be discussed, constraint layer stop 128 may limit downward flexing, bending or other movement of sense diaphragm 118. In some cases, the constraint layer stop 128 is formed integral with the constraint layer 146, while in other cases the constraint layer stop 128 is formed separate from the constraint layer 146 and attached to the constraint layer 146. In some instances, the constraint layer stop 128 is formed from or includes a different material than the constraint layer 146.

Pressure sensor 110 may also include a stop layer 130 including a top stop 132. Top stop 132 may be formed as a projection extending downward (in the illustrated orientation) towards sense diaphragm 118. As will be discussed, top stop 132 may limit upward flexing, bending or other movement of sense diaphragm 118. In some cases, the top stop 132 is formed integral with the stop layer 130, while in other cases the top stop 132 is formed separate from the stop layer 130 and attached to the stop layer 130. In some instances, the top stop 132 is formed from or includes a different material than the stop layer 130.

As shown, pressure sensor 110 includes several fluid paths that may be configured to provide a first pressure input and a second pressure input, and thus pressure sensor 110 can measure a relative difference between the first and second pressure inputs, or a differential pressure. Base layer 114 includes a fluid path 134 and constraint layer 146 includes a fluid path 136 that is fluidly coupled to fluid path 134 such that fluid path 134 and fluid path 136 in combination provide an input port to a first side 138 of the sense diaphragm 118. Similarly, stop layer 130 includes a fluid path 140 that extends through stop layer 130 and is fluidly coupled with a fluid path 142 such that fluid path 140 and fluid path 142 in combination provide an input port to a second side 144 of the sense diaphragm 118.

Accordingly, sense diaphragm 118 may bend, flex, deform, or otherwise move in an upward (in the illustrated orientation) direction if an input pressure impinging on first side 138 of sense diaphragm 118 is higher than an input pressure impinging on second side 144 of sense diaphragm 118. If sense diaphragm 118 moves far enough, sense diaphragm 118 will contact a stop surface 132a of top stop 132 such that top stop 132 limits movement of sense diaphragm 118 to help prevent possible damage to sense diaphragm 118 that could otherwise result from excessive movement (e.g. from overpressure). Similarly, sense diaphragm 118 may bend, flex, deform or otherwise move in a downward (in the illustrated orientation) direction if an input pressure impinging on second side 144 of sense diaphragm 118 is higher than an input pressure impinging on first side 138 of sense diaphragm 118. If sense diaphragm 118 moves far enough, sense diaphragm 118 will contact a stop surface 128a of constraint layer stop 128 such that constraint layer stop 128 limits movement of sense diaphragm 118 to help prevent possible damage to sense diaphragm 118 that could otherwise result from excessive movement.

In order to sense the aforementioned movement such as flexing or bending of sense diaphragm 118, pressure sensor 110 may include one or more sense elements 126 that may be disposed about sense diaphragm 118. Sense elements 126 may be any elements that are configured to convert mechanical movement, stress and/or deflection of sense diaphragm 118 into an electrical signal. In some embodiments, for example, sense elements 126 may be piezo-resistors. In some embodiments, sense elements 126 may, for example, be arranged in a Wheatstone bridge (e.g. Full or half bridge configuration) in order to provide an electrical signal that is indicative of the mechanical movement, stress and/or deflection of sense diaphragm 118.

Figure 3:
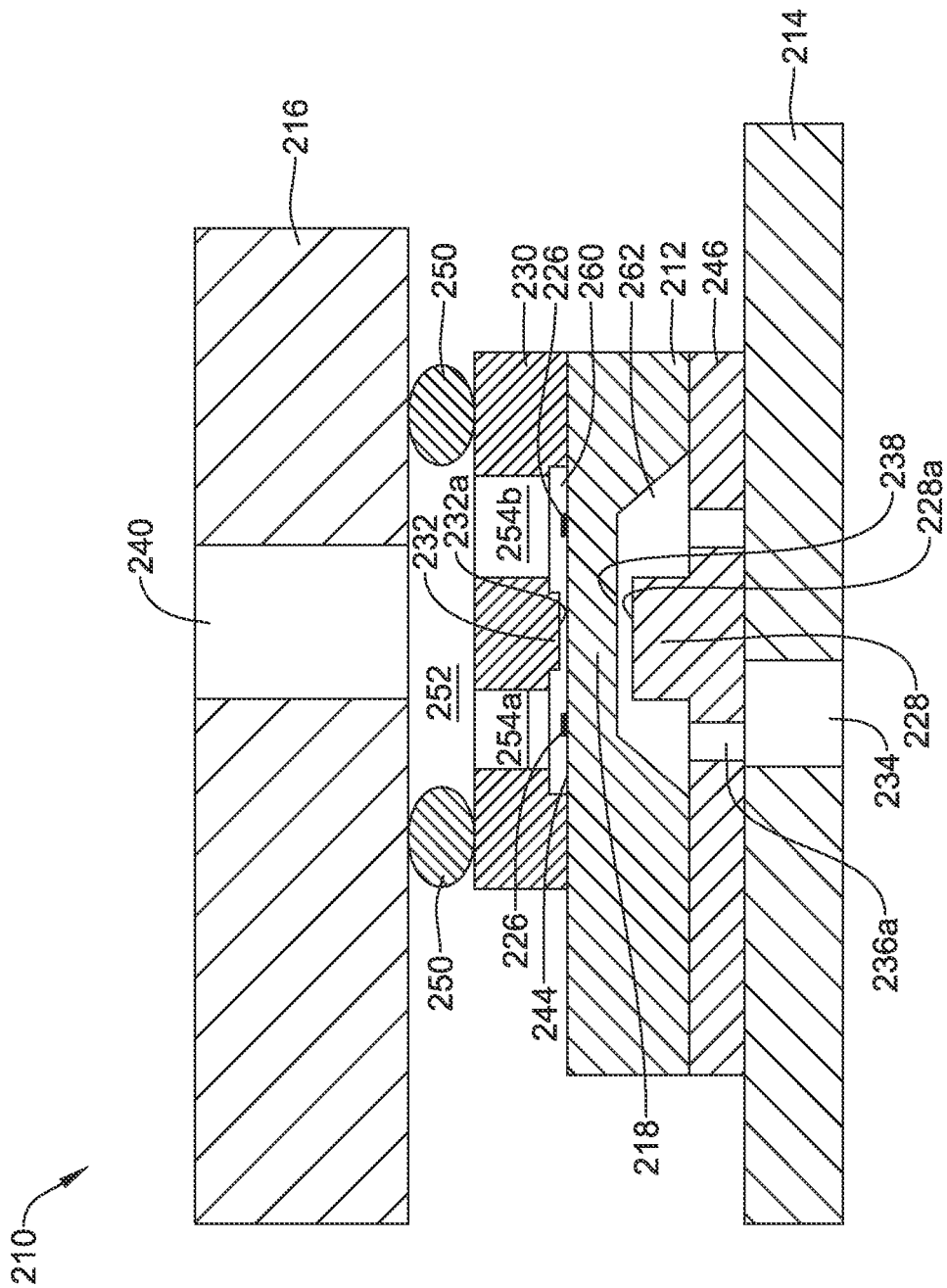
FIG. 3 is a schematic cross-sectional view of an illustrative pressure sensor.

FIG. 3 provides an illustrative but non-limiting example of another differential pressure sensor 210. Pressure sensor 210 may include a sense die 212, a base layer 214 and a top layer 216. Sense die 212 may include a sense diaphragm 218 that in some embodiments is defined by a portion of sense die 212 that is thinner than other portions of sense die 212.

Pressure sensor 210 may include a constraint layer 246 including a constraint layer stop 228. Constraint layer stop 228 may be formed as a raised portion of constraint layer 246 and may extend upward (in the illustrated orientation) towards sense diaphragm 218. Alternatively, constraint layer stop 228 may be formed separately from the constraint layer 246 and subsequently secured to the constraint layer 246. As will be discussed, constraint layer stop 228 may limit downward flexing, bending or other movement of sense diaphragm 218. Pressure sensor 210 may also include a stop layer 230 including a top stop 232. Top stop 232 may be a projection extending downward (in the illustrated orientation) towards sense diaphragm 218. As will be discussed, top stop 232 may limit upward flexing, bending or other movement of sense diaphragm 218.

As shown, pressure sensor 210 includes several fluid paths that may be configured to provide a first pressure input and a second pressure input, and thus pressure sensor 210 can measure a relative difference between the first and second pressure inputs, or a differential pressure. Base layer 214 includes a fluid path 234 and constraint layer 246 includes a fluid path 236a that is fluidly coupled to fluid path 234 and fluidly coupled to a fluid path 262 that, in combination, provides an input port to a first side 238 of sense diaphragm 218.

Likewise, a fluid path 240 extends through top layer 216 and is fluidly coupled to a fluid path 252. In some embodiments, as illustrated, fluid path 252 may be defined by an O-ring or other sealing structure 250 disposed between top layer 216 and stop layer 230. A fluid path 254a and a fluid path 254b are shown fluidly coupled to fluid path 252 and extend through stop layer 230 such that fluid path 254a and fluid path 254b are fluidly coupled to a fluid path 260 in order to provide an input pressure to a second side 244 of sense diaphragm 218.

In this configuration, sense diaphragm 218 may bend, flex or otherwise move in an upward (in the illustrated orientation) direction if an input pressure impinging on first side 238 of sense diaphragm 218 is higher than an input pressure impinging on second side 244 of sense diaphragm 218. If sense diaphragm 218 moves far enough, sense diaphragm 218 will contact a stop surface 232a of top stop 232 such that top stop 232 limits movement of sense diaphragm 218 to help prevent possible damage to sense diaphragm 218 that could otherwise result from excessive movement. Similarly, sense diaphragm 218 may bend, flex or otherwise move in a downward (in the illustrated orientation) direction if an input pressure impinging on second side 244 of sense diaphragm 218 is higher than an input pressure impinging on first side 238 of sense diaphragm 218. If sense diaphragm 218 moves far enough, sense diaphragm 218 will contact a stop surface 228a of constraint layer stop 228 such that constraint layer stop 228 limits movement of sense diaphragm 218 to help prevent possible damage to sense diaphragm 218 that could otherwise result from excessive movement.

In order to sense the aforementioned movement such as flexing or bending of sense diaphragm 218, pressure sensor 210 may include one or more sense elements 226 that may be disposed about sense diaphragm 218. Sense elements 226 may be any elements that are configured to convert a mechanical movement, stress and/or deflection of sense diaphragm 218 into an electrical signal. In some embodiments, for example, sense elements 226 may be piezo-resistors. In some embodiments, sense elements 226 may, for example, be arranged in a Wheatstone bridge (full or half bridge configuration) in order to provide an electrical signal that is indicative of the mechanical movement, stress and/or deflection of sense diaphragm 218.

As discussed, the stops described herein may help prevent excessive movement of sense diaphragm 18, 118, 218 that could otherwise cause damage as a result of a sufficiently large input pressure. In some instances, there is a possibility of static friction, or "stiction", between the material forming the sense diaphragm and the material forming the stop which the sense diaphragm is contacting. Subsequent Figures provide illustrative but non-limiting examples of stop configurations that may be employed in pressure sensors such as pressure sensor 10, 110, 210 in order to help limit or reduce stiction. In some embodiments, the stop may have a surface facing the sense diaphragm that includes a plurality of defined projections. These projections may be regular or irregular, patterned or random.

Figure 4:
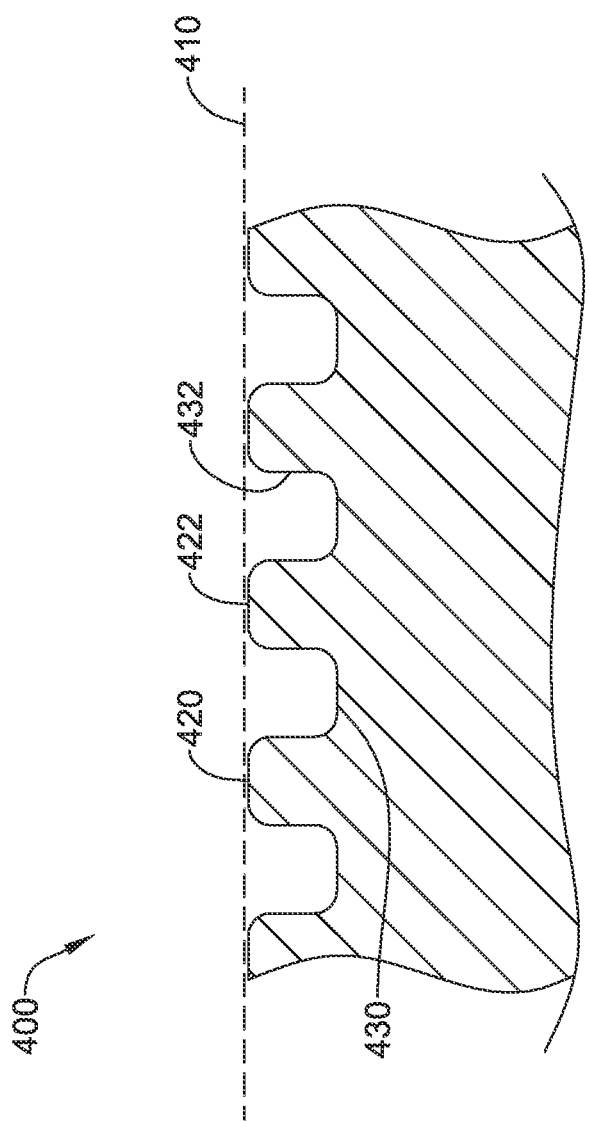
FIG. 4 is a schematic cross-sectional view of a portion of an illustrative stop that is usable in the pressure sensors of FIGS. 1-3.

FIG. 4 provides a schematic cross-section of a portion of a stop 400. It will be appreciated that stop 400 can represent any of the stops described in FIGS. 1-3, such as stop 22, top stop 132, 232 or constraint layer stop 128, 228. Stop 400 may be considered as generally defining a surface 410, indicated by dashed lines. A number of recesses 430 may be formed in surface 410, thereby defining a number of projections 420. It will be appreciated that stop 400 may alternatively be considered as including a number of projections extending from a surface, with recesses defined between the projections. In some embodiments, recesses 430 are etched into stop 400. In some embodiments, as illustrated, the projections 420 may have front facing surfaces 422 that have rounded edges. In some embodiments, each of the projections 420 have a front facing surface 422, and a combined surface area of all of the front facing surfaces 422 of the projections 420 may be between about 5 and 60 percent of the cross-sectional area defined by the overall cross-sectional area defined by the perimeter of the stop 400.

In some instances, the recesses 430 may be etched into stop 400 using an anisotropic etch, which may produce relatively sharp edges around the perimeter of the front facing surface 422 and down the etched side walls 432 of each of the projections 420. The anisotropic etch may be a Reactive Ion Etch, or any other suitable etch as desired. Thereafter, the sharp edges produced by the anisotropic etch may be rounded off by applying an isotropic etch. The length of time spent in the isotropic etch may dictate the relative degree to which the edges are rounded. In some instances, between 10-100% of the front facing surface 422 of the projections is rounded, with the remainder (if any) being relatively flat and planar with respect to surface 410. In some instances, between 30-90% of the front facing surface 422 of the projections is rounded, with the remainder (if any) being relatively flat and planar with respect to surface 410. In some instances, between 40-70% of the front facing surface 422 of the projections is rounded, with the remainder (if any) being relatively flat and planar with respect to surface 410. These are just examples. In some cases, the projections 420 may be formed by mechanically grinding, cutting, sandblasting, or otherwise mechanically manipulating a front facing surface of a stop, as desired.

Figure 5:
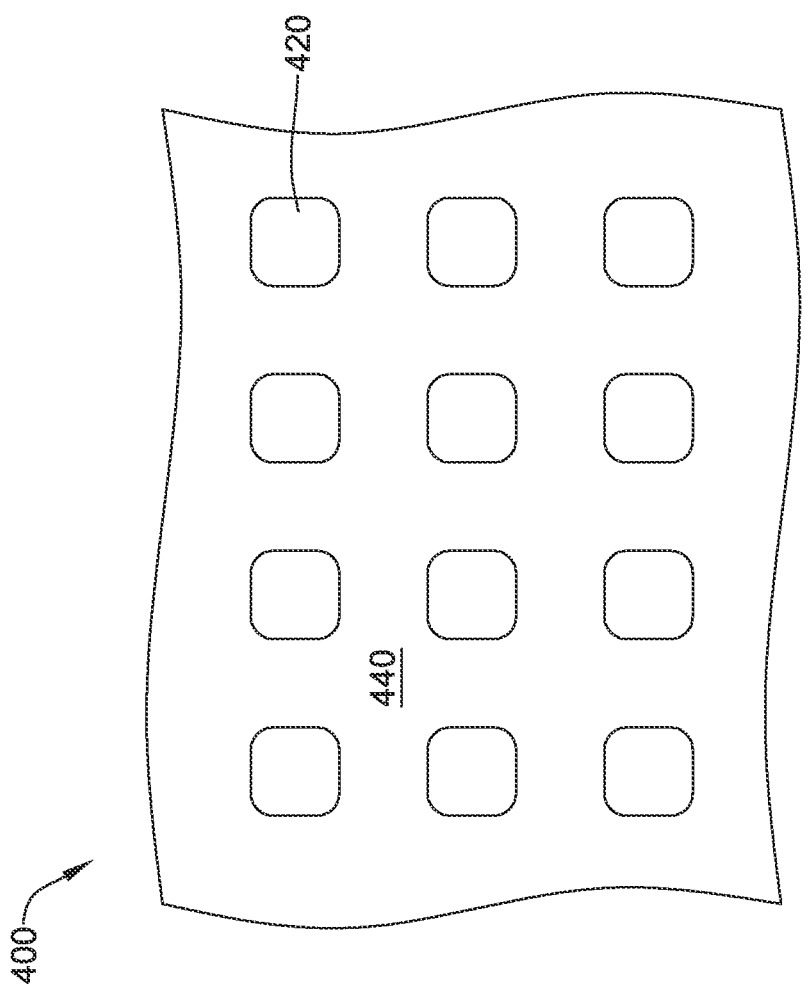
FIG. 5 is a top plan view of a portion of an illustrative stop that is usable in the pressure sensors of FIGS. 1-3.

FIG. 5 is a top view of stop 400, illustrating an embodiment in which projections 420 are arranged in a regular pattern, in rows and columns. In some embodiments, flow channels 440 may be defined between adjacent projections, and/or between adjacent rows and columns of projections 420. Flow channels 440 may be formed, for example, via etching. At least some of projections 420 may have an average height that is at least about 100 microns. FIGS. 4 and 5 illustrate a stop 400 having a planar profile. In some embodiments, a suitable stop may have a curved or otherwise non-planar profile in order to reduce stiction, such as shown in FIG. 6.

Figure 6:
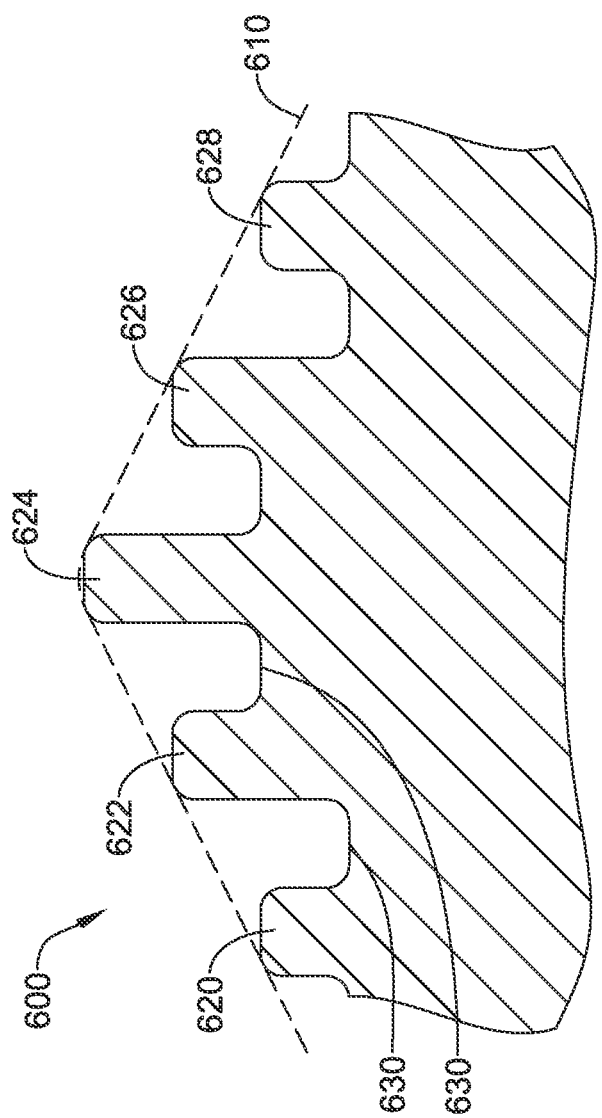
FIG. 6 is a schematic cross-sectional view of a portion of an illustrative stop that is usable in the pressure sensors of FIGS. 1-3.

FIG. 6 provides a schematic cross-section of a portion of a stop 600. It will be appreciated that stop 600 can represent any of the stops described in FIGS. 1-3, such as stop 22, top stop 132, 232 or constraint layer stop 128, 228. Stop 600 may be considered as defining a surface 610, indicated by dashed lines. Unlike FIGS. 4 and 5, which show a planar surface 410, surface 610 is curved. In some instances, a number of recesses 630 may be formed in surface 610, thereby defining a number of projections 620, 622, 624, 626, 628. In the illustrated stop, surface 610 includes a first projection 620 that extends to a first height, a second projection 622 that extends to a second height, a third projection 624 that extends to a third height, a fourth projection 626 that extends to a fourth height and a fifth projection 628 that extends to a fifth height. It will be appreciated that the number of projections shown is illustrative only, and that stop 600 may have a larger number of projections. It can be seen that stop 600 is configured such that the projections closer to a periphery of stop 600 extend to a height that is less than projections that are closer to a center of stop 600, although this is not required. It will be appreciated that FIG. 6 is not to scale, as in some embodiments there may be a 5 to 15 micron difference in projection height between projections near the periphery of stop 600 relative to projections near the center of stop 600.

In some embodiments, projections 620, 622, 624, 626, 628 may be arranged in a regular pattern, such as projections 420 shown in FIGS. 4 and 5. As illustrated, surface 610 may be considered as defining a simple curve. In some embodiments, it is contemplated that surface 610 may not represent a simple curve, but rather may have a shape better described by an oscillating or sinusoidal curve. In some embodiments, surface 610 may be considered as being convex. In some embodiments, surface 610 may instead be concave.

Figure 7:
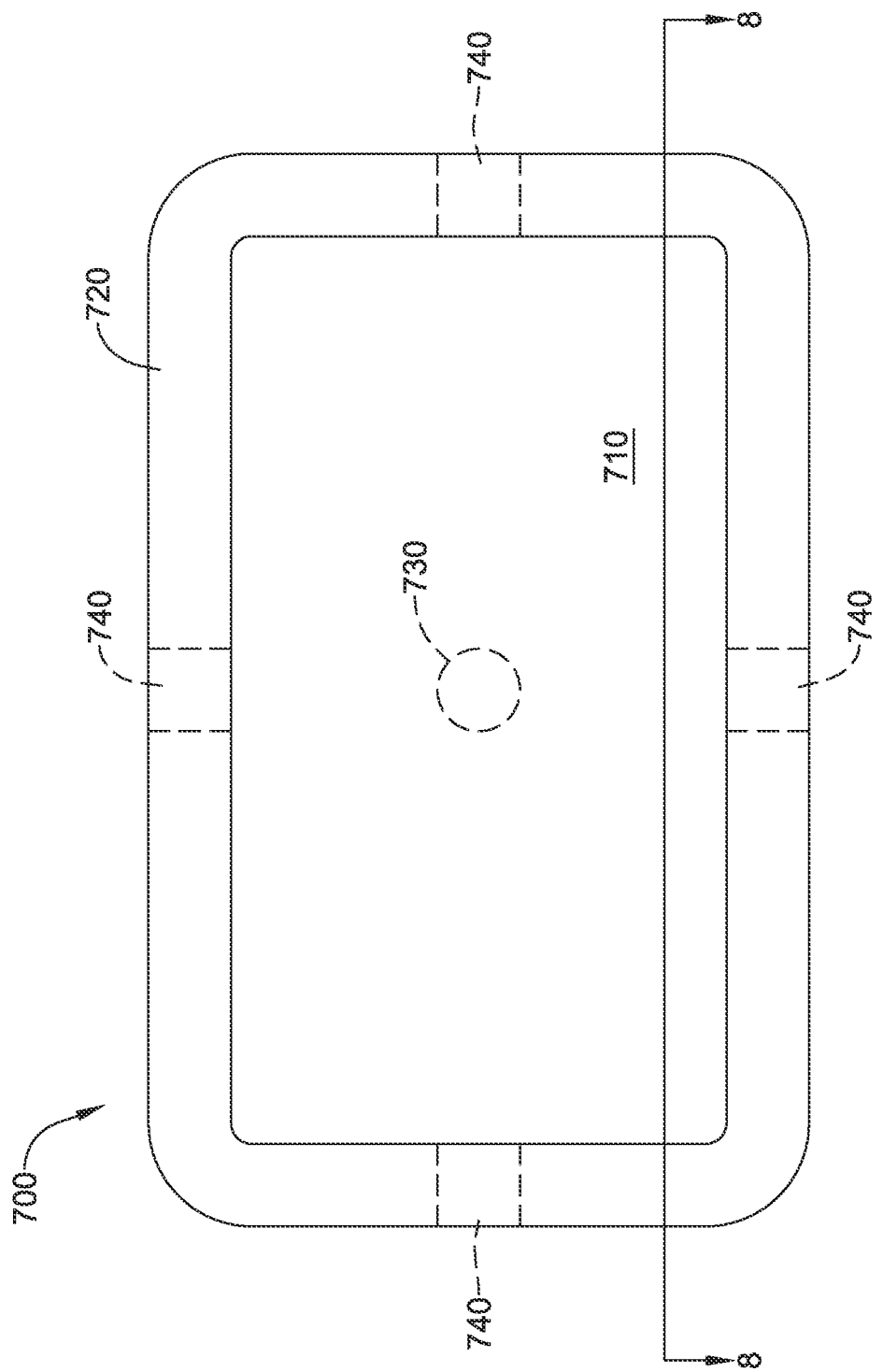
FIG. 7 is a top plan view of a portion of an illustrative stop that is usable in the pressure sensors of FIGS. 1-3.
Figure 8:
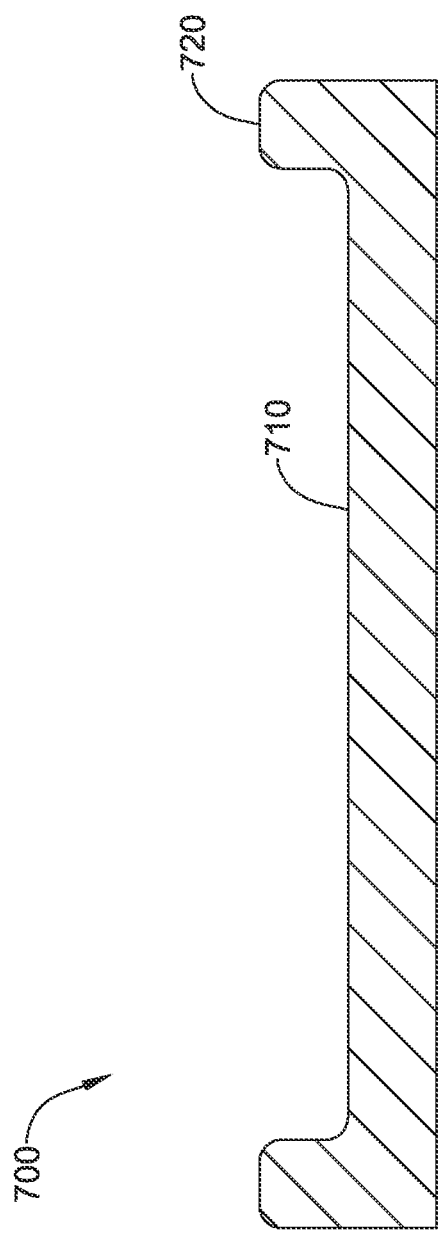
FIG. 8 is a schematic cross-sectional view of the illustrative stop of FIG. 7 taken along line 8-8.

FIG. 7 provides a top plan view of another illustrative stop 700. FIG. 8 provides a schematic cross-sectional view of the illustrative stop of FIG. 7 taken along line 8-8. It will be appreciated that stop 700 can represent any of the stops described in FIGS. 1-3, such as stop 22, top stop 132, 232 or constraint layer stop 128, 228. Illustrative stop 700 includes a surface 710 and a raised perimeter 720 that extends above (in the illustrated orientation) surface 710. If an overpressure causes a sense diaphragm to contact stop 700, the sense diaphragm may only contact raised perimeter 720. In some embodiments, as illustrated in FIG. 7, stop 700 may also include one or more raised projections 730 that are located within surface 710. While a single raised projection 730 is shown, it will be appreciated that stop 700 may include any number of raised projections 730, arranged in any desired pattern on surface 710. In some embodiments, while not required, raised perimeter 720 may include one or more cutouts 740. Cutouts 740, if present, may help the sense diaphragm move away from stop 700 by permitting fluid flow (e.g. air) between the sense diaphragm and surface 710 during movement of the sense diaphragm.

Figure 9:
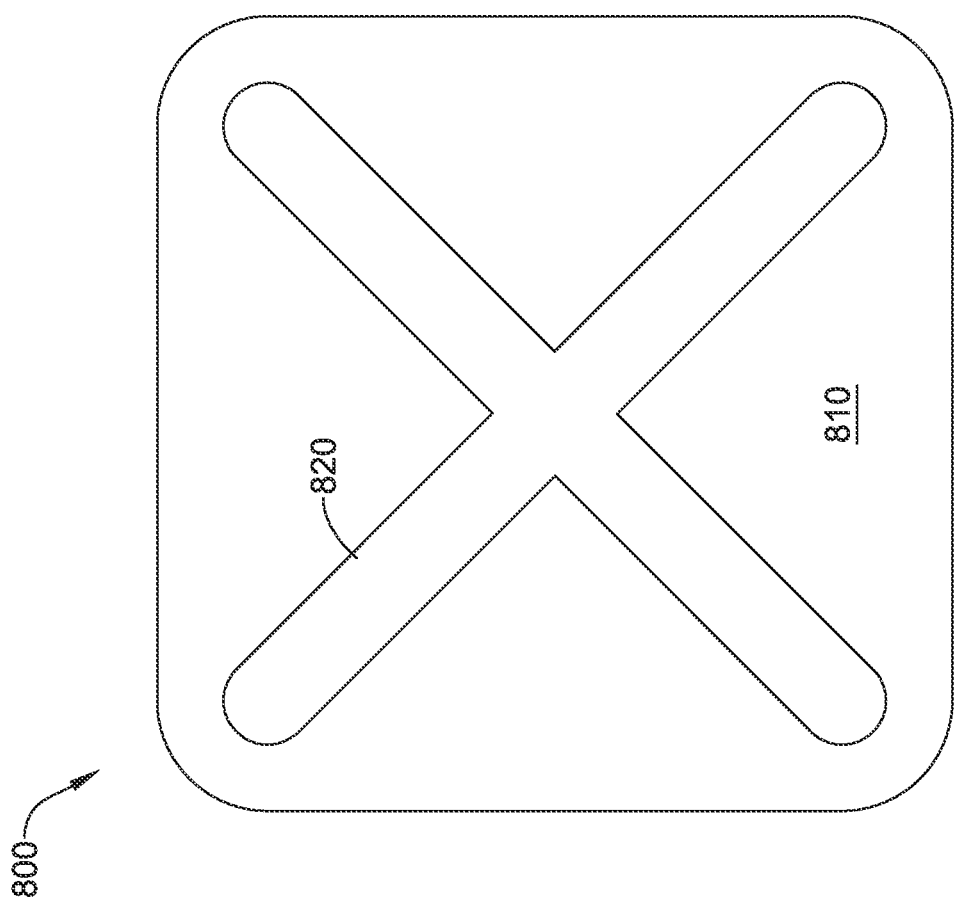
FIG. 9 is a top plan view of a portion of an illustrative stop that is usable in the pressure sensors of FIGS. 1-3.

FIG. 9 provides a top plan view of yet another illustrative stop 800. It will be appreciated that stop 800 can represent any of the stops described in FIGS. 1-3, such as stop 22, top stop 132, 232 or constraint layer stop 128, 228. Illustrative stop 800 includes a surface 810 and a raised pattern 820. In the illustrated embodiment, raised pattern 820 is in the shape of a large X, which may be in registration with an adjacent sense diaphragm (not shown). A variety of different shapes are contemplated. For example, raised pattern 820 may be in the form of an asterisk. Raised pattern 820 may be in the form of a number sign, or hashtag. It will be appreciated that stop 800 may include a single raised pattern 820, as shown, or may include several relatively smaller raised patterns dispersed around surface 810.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A pressure sensor for sensing an input pressure, the pressure sensor comprising:
    an input for receiving an input pressure;
    a sense die having a sense diaphragm, the sense diaphragm exposed to the input pressure and configured to deflect in response to the input pressure;
    one or more sense elements operatively coupled to the sense diaphragm to sense a deflection of the sense diaphragm; and
    a first diaphragm stop positioned adjacent to a first side of the sense diaphragm to limit the deflection of the sense diaphragm towards the first diaphragm stop, the first diaphragm stop comprising a first diaphragm stop surface facing the first side of the sense diaphragm, wherein the first diaphragm stop surface is configured to engage the sense diaphragm when the sense diaphragm has deflected by a predefined amount due to the input pressure, the first diaphragm stop surface comprising a plurality of defined projections.

2. The pressure sensor of claim 1, wherein the plurality of defined projections are arranged in a predefined pattern.

3. The pressure sensor of claim 1, wherein the plurality of defined projections include one or more flow channels between the plurality of defined projections.

4. The pressure sensor of claim 3, wherein the one or more flow channels are etched and have etched side walls.

5. The pressure sensor of claim 1, wherein each of the plurality of defined projections have a front facing surface that defines part of the first diaphragm stop surface, and wherein the front facing surface of each of the plurality of defined projections has rounded edges.

6. The pressure sensor of claim 1, wherein at least some of the plurality of defined projections have a height of at least 100 microns.

7. The pressure sensor of claim 1, wherein each of the plurality of defined projections extend to a height, and wherein at least some of the plurality of defined projections that are located closer to a perimeter of the first diaphragm stop surface extend to a height that is less than at least one of the plurality of defined projections that are located closer to a center of the first diaphragm stop surface.

8. The pressure sensor of claim 1, wherein:
    a perimeter of the sense diaphragm defines a cross-sectional surface area;
    a perimeter of the first diaphragm stop surface defines a cross-sectional area, wherein the cross-sectional area defined by the perimeter of the first diaphragm stop surface is between 10 and 95 percent of the cross-sectional area defined by the perimeter of the sense diaphragm.

9. The pressure sensor of claim 8, wherein the cross-sectional area defined by the perimeter of the first diaphragm stop surface is between 60 and 90 percent of the cross-sectional area defined by the perimeter of the sense diaphragm.

10. The pressure sensor of claim 8, wherein each of the plurality of defined projections have a front facing surface, and wherein the front facing surfaces of all of the plurality of defined projections combined is between 5 and 60 percent of the cross-sectional area defined by the perimeter of the first diaphragm stop surface.

11. The pressure sensor of claim 1, wherein the input comprises a first input port for receiving a first differential pressure and a second input port for receiving a second differential pressure, wherein the first side of the sense diaphragm is exposed to the first differential pressure and a second side of the sense diaphragm is exposed to the second differential pressure.

12. The pressure sensor of claim 11, further comprising:
    a second diaphragm stop positioned adjacent to the second side of the sense diaphragm to limit deflection of the sense diaphragm towards the second diaphragm stop, the second diaphragm stop comprising a diaphragm stop surface facing the second side of the sense diaphragm, the diaphragm stop surface comprising a plurality of defined projections.

13. A pressure sensor for sensing an input pressure, the pressure sensor comprising:
    an input for receiving an input pressure;
    a sense die having a first major surface and an opposing second major surface, with a recess in the first major surface to form a recessed first surface, wherein a sense diaphragm is defined between the recessed first surface and the second major surface of the sense die;
    the sense diaphragm being exposed to the input pressure and configured to deflect in response to the input pressure;
    one or more sense elements operatively coupled to the sense diaphragm to sense a deflection of the sense diaphragm;
    a first substrate secured relative to the first major surface of the sense die, the first substrate having a first diaphragm stop that extends away from the first substrate and into the recess in the sense die and adjacent to the recessed first surface of the sense diaphragm to limit deflection of the sense diaphragm towards the first diaphragm stop when the sense diaphragm has deflected by a predefined amount due to the input, pressure; and
    a second substrate secured relative to the second major surface of the sense die.

14. The pressure sensor of claim 13, wherein the second substrate has a second diaphragm stop that extends adjacent to the second major surface of the sense diaphragm to limit deflection of the sense diaphragm towards the second diaphragm stop.

15. The pressure sensor of claim 13, wherein the first substrate is secured to the first major surface of the sense die, and the second substrate is secured to the second major surface of the sense die.

16. The pressure sensor of claim 15, wherein the input comprises a first input port for receiving a first differential pressure and a second input port for receiving a second differential pressure, wherein the first substrate includes a first port in fluid communication with the first input port for delivering the first differential pressure to a first side of the sense diaphragm and the second substrate includes a second port in fluid communication with the second input port for delivering the second differential pressure to a second side of the sense diaphragm.

17. The pressure sensor of claim 13, wherein the first diaphragm stop comprises a plurality of defined projections with one or more flow channels between the plurality of defined projections.

18. The pressure sensor of claim 17, wherein each of the plurality of defined projections have a front facing surface, wherein the front facing surface of each of the plurality of defined projections has rounded edges.

19. A pressure sensor for sensing an input pressure, the pressure sensor comprising:
   an input for receiving an input pressure;
   a sense diaphragm exposed to the input pressure and configured to deflect in response to the input pressure;
   one or more sense elements operatively coupled to the sense diaphragm to sense the deflection of the sense diaphragm; and
   a diaphragm stop positioned adjacent to the sense diaphragm to limit deflection of the sense diaphragm, the diaphragm stop having a diaphragm stop surface for engaging the sense diaphragm when the sense diaphragm has deflected by a predefined amount due to the input pressure, the diaphragm stop surface has a topography that is configured to reduce stiction between the diaphragm stop surface and the sense diaphragm relative to a smooth diaphragm stop surface.

20. The pressure sensor of claim 19, wherein the topography of the diaphragm stop surface includes a plurality of defined projections with one or more flow channels between the plurality of defined projections.

* * * * *